F. I. DU PONT.
LIQUID GRAVITY SEPARATION OF SOLIDS.
APPLICATION FILED DEC. 1, 1909. RENEWED MAR. 1, 1911.
1,004,815.
Patented Oct. 3, 1911.
3 SHEETS—SHEET 2.
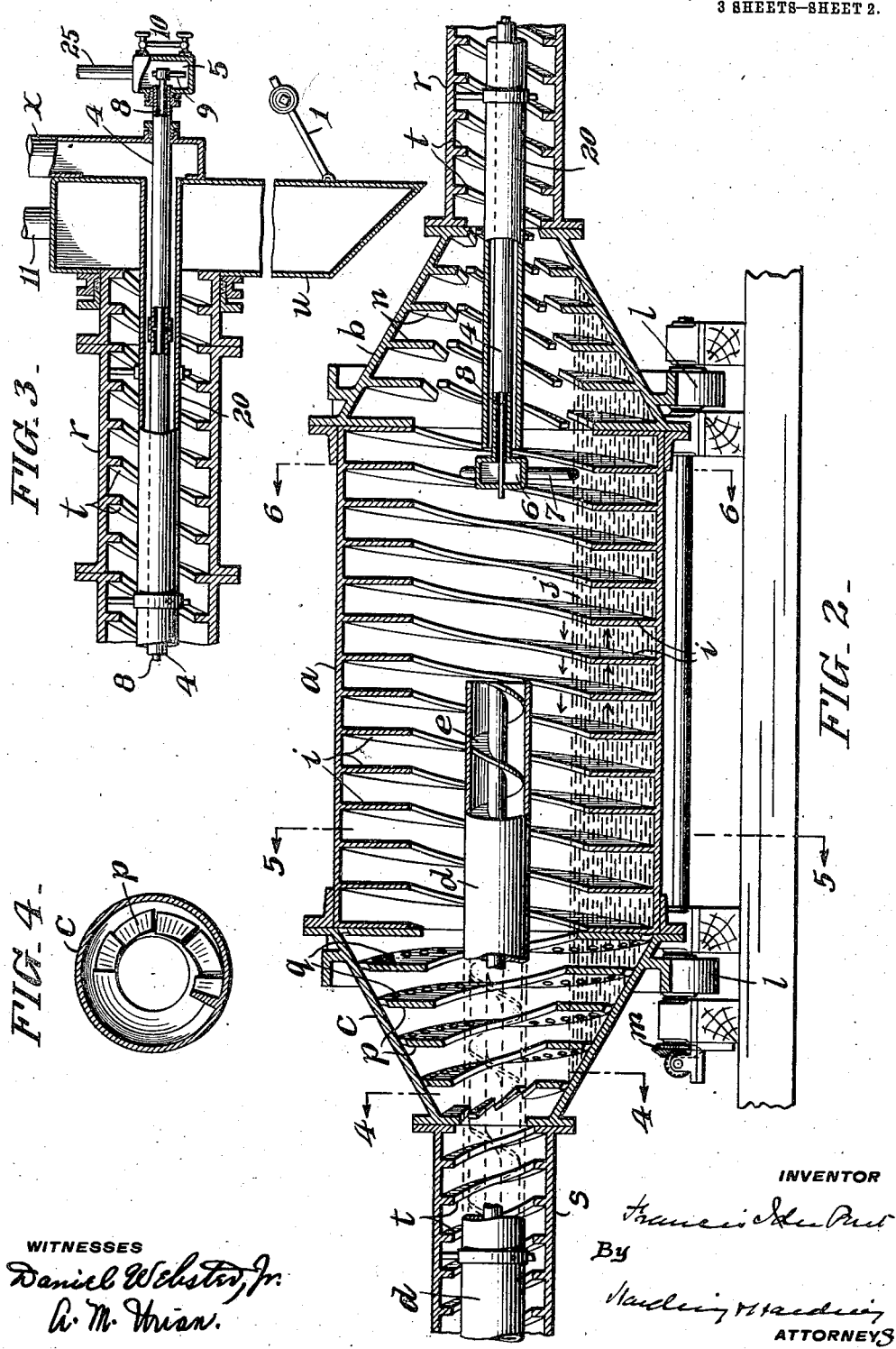

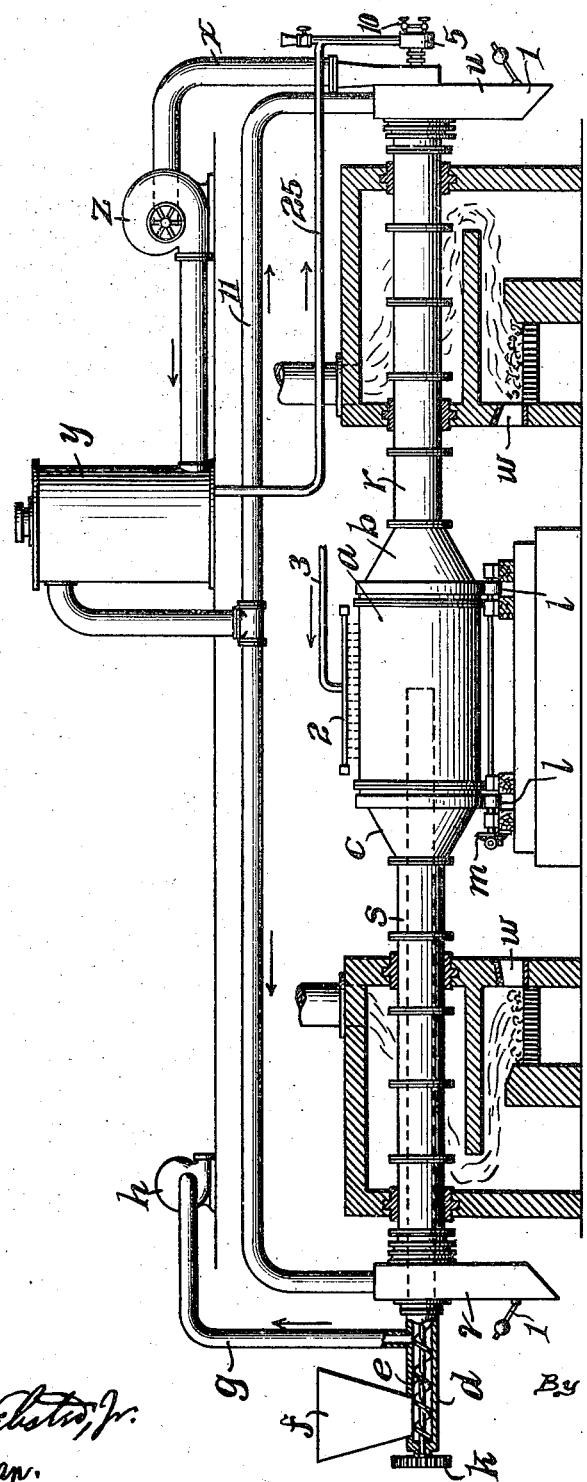

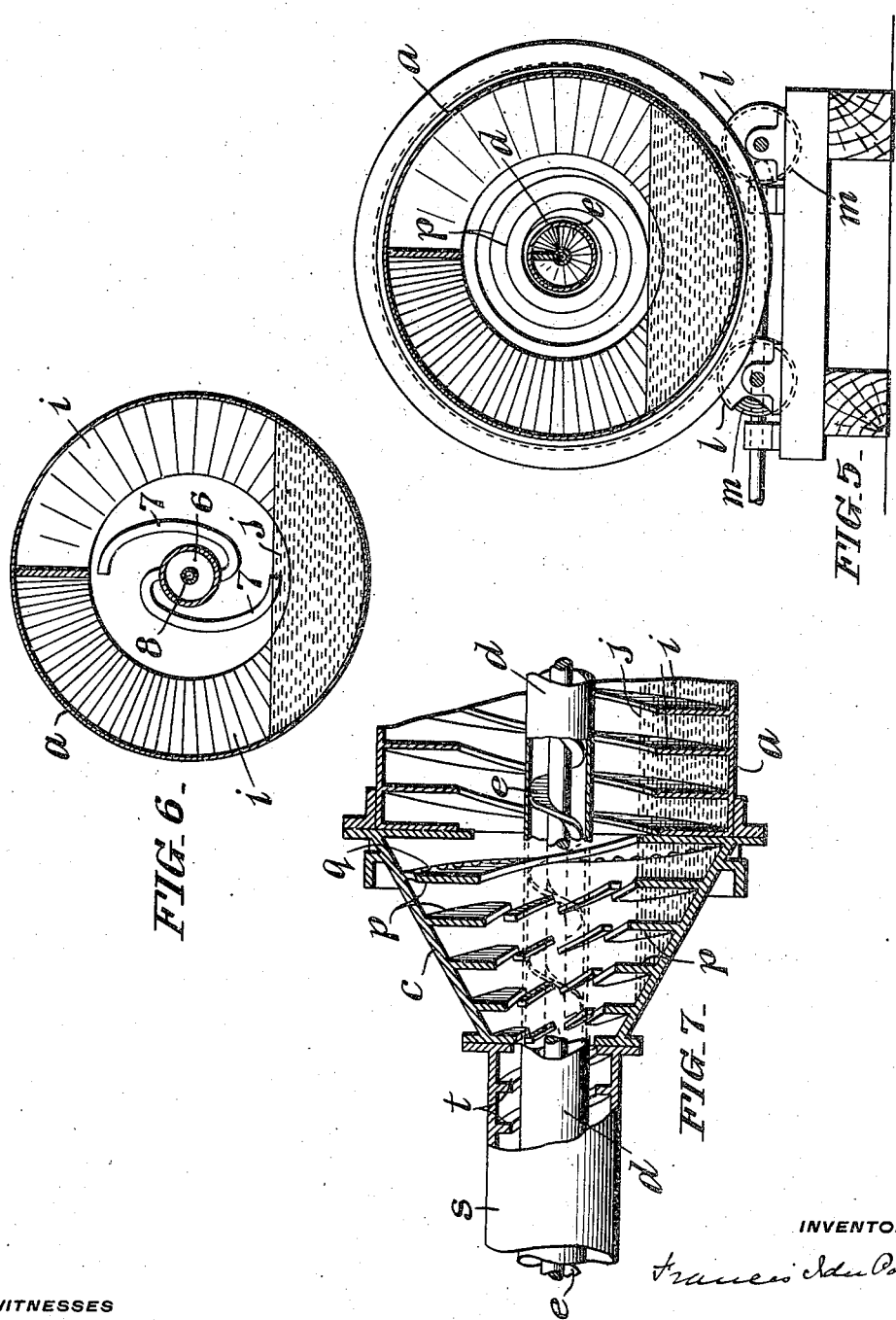

UNITED STATES PATENT OFFICE.

FRANCIS I. DU PONT, OF WILMINGTON, DELAWARE.

LIQUID GRAVITY SEPARATION OF SOLIDS.

1,004,815.  Specification of Letters Patent.  Patented Oct. 3, 1911.

Application filed December 1, 1909, Serial No. 530,764. Renewed March 1, 1911. Serial No. 611,556.

*To all whom it may concern:*

Be it known that I, FRANCIS I. DU PONT, a citizen of the United States, residing at Wilmington, county of Newcastle, and State of Delaware, have invented a new and useful Improvement in Liquid Gravity Separation of Solids, of which the following is a full, clear, and exact description.

In certain applications filed by me December 1st, 1909, Serial Nos. 530,761, 530,762, 530,763 for the recovery by volatilization of the liquid carried off attached to the solids, after the separation with certain of these liquids there is a tendency in the volatilization to produce decomposition when the same is being driven off and leaving a small residuum in the ore, which might cause an appreciable loss of the original liquid as it then cannot be carried back to the separating vessel. As an example of this, taking antimony chlorid, I have found when being volatilized it will leave a small residuum of antimony oxid or oxychlorid in the ore, which might cause an appreciable loss of antimony, thus materially adding to the expense of the process.

I have discovered that I can prevent oxid or oxychlorid of the base of the salt used from being formed or remaining by adding a halid of ammonia, for instance, ammonia chlorid. The halids of ammonia, being of a slightly higher volatilizing point than such liquids as produce such oxid or oxychlorid, will remain behind and the halid will react with any oxid or oxychlorid forming or tending to form, causing such oxid or oxychlorid to be volatilized, and it thus can be recovered and carried back to the separating system without difficulty. The base of the oxid or oxychlorid depends upon the salt used, thus, if, as stated in the example, antimony chlorid be used the base of the oxid or oxychlorid will be antimony.

As I have stated, I prefer to add the halid of ammonia in the separating tank and preferably it should be about 1 or 2 per cent. of the separating liquid. It might be well to add this halid of ammonia to all of the separating liquids mentioned in my applications hereinbefore recited for the reason that its condition can do no harm and it makes certain the prevention of any residuum left in the ore.

In general, the process, as shown in my application filed December 1, 1909, Serial No. 530,759, consists in separating the solids by means of a liquid in a separating tank, carrying the solids away from the liquid and recovering by volatilization the liquid carried by such solids. The apparatus illustrated and described in that application, filed December 1st, 1909, Serial No. 530,759, and which apparatus is described, illustrated and claimed in a division of that application, filed January 25th, 1910, Serial No. 539,960, may be used to carry out the process of this invention.

In that apparatus—Figure 1 is an elevation of my apparatus partially broken away. Fig. 2 is a longitudinal section through separating drum. Fig. 3 is a longitudinal section through one end of apparatus. Figs. 4, 5 and 6 are sections respectively on the lines 4—4, 5—5 and 6—6 of Fig. 2. Fig. 7 is a partial view showing modification of left hand conical end, of Fig. 2.

$a$ is a cylindrical vessel having the conical extensions $b$ and $c$.

$d$ is the inlet tube through which the ore to be separated passes into the cylinder $a$. In the interior of this tube is the conveyer $e$ for carrying the ore through the tube.

$f$ is the receiving hopper opening into the tube $d$.

$g$ is a pipe extending from the tube $d$ and connected with the suction device $h$ to prevent any air entering the cylinder with the ore. The interior of the cylinder has the projecting spiral blade $i$ which projects from the inner periphery of the cylinder.

$j$ represents the liquid level. Where the ore to be separated is, as hereinbefore stated, limonite, and the liquid stannic chlorid, such liquid is of greater specific gravity than water and of less specific gravity than some of the ingredients of the ore. The end of the shaft carrying the conveyer $e$ has the gear $k$ which is rotated by appropriate means, not shown.

The cylinder $a$ and its extensions are supported on the rollers $l$, and these rollers are rotated by means of the gearing $m$. In the conical end $b$ is the peripheral sectional projecting spiral blade $n$, the sections being staggered with respect to each other, so as to leave a space between them. In the conical end $c$ is the spiral blade $p$, some of the turns of which have orifices $q$. Beyond the conical ends $b$ and $c$ are the cylindrical portions $r$ and $s$, each provided with conveying blades $t$. These cylindrical portions terminate in the hoppers $u$ and $v$ respectively. The cylindrical portions $r$ and $s$ each extend through a furnace in which the liquid is driven off in the form of vapor. Each of the hoppers $u$ and $v$ has a slide operated by the lever $f$ for closing the discharge end of the hopper and preventing the ingress of air. The exterior of the cylinder $a$ has water sprayed upon it from the sprayer 2, fed by the pipe 3.

In order to determine the level of the liquid in the cylinder and maintain its level constant, I use the following construction: 4 is a pipe which passes centrally through the conical end $b$ and its cylindrical extension and terminates in the reservoir 5, which is non-rotatably mounted. Surrounding the pipe 4 is a sheet metal pipe 20, having an open end in cylinder $a$. The gas from the interior of cylinder $a$ passes into the space between the two pipes 20 and 4. $x$ is a pipe leading from pipe 20 to condenser $y$. On this pipe is the suction fan $z$. From the top of the condenser $y$, pipes 11 lead to the respective hoppers $u$ and $v$. By this arrangement the space between the pipes 20 and 4 is maintained cool, thus maintaining the liquid in pipe 4 as a liquid. The inner end of pipe 4 terminates in the reservoir 6. From this reservoir 6 extend the curved ended pipes 7, the mouths of which are at the desired level of the liquid in the cylinder. Extending through the pipe 4 is a smaller pipe 8, the inner end of which passes through reservoir 6 and opens into cylinder $a$, the outer end terminating in the pipe 9, having curved ends, in the reservoir 5. A pipe 25 leads from the lower end of condenser $y$ to the reservoir 5. When the cylinder $a$, its conical ends, and extensions are revolved and the material fed therein, and liquid being in the cylinder to the level shown, there is a circulation of the liquid as shown by the arrows. The lighter ingredients are carried to the conical end $c$ and the heavier to the conical end $b$, the heavier and lighter ingredients separating during this travel. In the conical end $b$ the blades carry the heavier ingredient forward and upward, and due to the staggering of the blades, the liquid runs off so that when the cylindrical extension is reached, it is free from all but the adhering liquid. Further movement in the cylindrical extension carries it through the evaporator, the fumes passing back to cylinder $a$ where they are condensed by the spray. In a similar manner when the lighter ingredients are carried to the conical end $c$, the blades, as it were, skim off the solids, the liquid escaping through the orifices. If desired, as shown in Fig. 7, only the first few turns of the spiral may be perforated, as this may be sufficient to carry off practically all the liquid and the remainder of the spiral may be staggered, as shown with respect to the spiral in end $b$, Fig. 2. This material in this cylindrical extension, as was done with respect to the heavier ingredient, passes through the evaporator, the gases returning to the cylinder $a$ where they are condensed. If the liquid tends to rise in the cylinder beyond its desired height, the pipe 7 will catch it and through reservoir 6 and pipe 4 deliver it to reservoir 5. By means of the gauge 10 in connection with said receiver, the height of the liquid in the reservoir 5 may readily be determined. The pipe 9 will constantly deliver liquid from reservoir 5 to the cylinder, but, being smaller, always in less quantity than it would be delivered from the cylinder $a$ to the reservoir 5, if $a$ should contain an excess. This, with the liquid passing through the pipes between the condenser and reservoir 5, enables the level of the liquid in the cylinder to be maintained.

The purpose of the system of piping, fan and condenser $x$, $z$ and $y$ is to insure definitely that the flow of vapor shall be from the evaporators to the central cylinder which is cooled; also to condense any excess of vapors which may not be condensed in the cylinder $a$. The purpose of the return pipes 11, is to avoid the necessity for the entrance of any more atmospheric air than is absolutely unavoidable, using in place thereof air always charged with whatever amount of vapors it will contain, after having passed through the condenser, this therefore, produces a substantially closed system in which no vapors or substantially no vapors are carried off by any entering or escaping air. The purpose of the fan $h$ and pipe $g$ is to determine sufficient suction in the pipe $e$ to balance the tendency of the entering solids to carry air into the cylinder $a$.

Having now fully described my invention, what I claim and desire to protect by Letters Patent is:—

1. The process of liquid separation of solids, which consists in separating the solids in a liquid which is the halid of a metal, whose halids are volatilizable, conveying the separated ingredients produced by the separation from the liquid and subjecting the same to a heat sufficient to volatilize, and adding to the liquid a halid of ammonia prior to said volatilization.

2. The process of liquid separation of solids, which consists in separating the solids in a liquid which is the halid of a metal, whose halids are volatilizable, conveying the separated ingredients produced by the separation from the liquid and subjecting the same to a heat sufficient to volatilize, and adding to the liquid at the point of separation a halid of ammonia.

3. The process of liquid separation of solids, which consists in separating the solids in a liquid which is the halid of a metal, whose halids are volatilizable, conveying the separated ingredients produced by the separation from the liquid and subjecting the same to a heat sufficient to volatilize, and adding to the liquid from 1 to 2 per cent. of a halid of ammonia prior to said volatilization.

4. The process of liquid separation of solids, which consists in separating the solids in a liquid which is the halid of a metal, whose halids are volatilizable, conveying the separated ingredients produced by the separation from the liquid and subjecting the same to a heat sufficient to volatilize, and adding to the liquid at the point of separation from 1 to 2 per cent. of a halid of ammonia.

5. In the process of liquid separation of solids, separating the solid constituents in a liquid comprising a halid of a metal, whose halids are volatilizable, and a halid of ammonia.

6. In the process of liquid separation of solids, separating the solid constituents in a liquid comprising a halid of a metal, whose halids are volatilizable, and from 1 to 2 per cent. of a halid of ammonia.

In testimony of which invention, I have hereunto set my hand, at Philadelphia, on this 26th day of November, 1909.

FRANCIS I. DU PONT.

Witnesses:
M. M. HAMILTON,
A. M. URIAN.